United States Patent [19]
Ozawa

[11] Patent Number: 5,682,854
[45] Date of Patent: Nov. 4, 1997

[54] VARIABLE COMPRESSION RATIO ENGINE

[75] Inventor: Godo Ozawa, Utsunomiya, Japan

[73] Assignee: Komatsu Ltd., Tokyo, Japan

[21] Appl. No.: 704,524

[22] PCT Filed: Mar. 3, 1995

[86] PCT No.: PCT/JP95/00341
§ 371 Date: Sep. 6, 1996
§ 102(e) Date: Sep. 6, 1996

[87] PCT Pub. No.: WO95/24549
PCT Pub. Date: Sep. 14, 1995

[30] Foreign Application Priority Data

| Mar. 7, 1994 | [JP] | Japan | 6-64550 |
| Mar. 23, 1994 | [JP] | Japan | 6-76604 |
| Mar. 30, 1994 | [JP] | Japan | 6-85876 |

[51] Int. Cl.[6] .................... F02M 25/07; F01L 1/12
[52] U.S. Cl. .................... 123/316; 123/432; 123/568
[58] Field of Search .................... 123/316, 315, 123/308, 432, 90.15, 568

[56] References Cited

U.S. PATENT DOCUMENTS

| 4,552,112 | 11/1985 | Nagao et al. | 123/432 |
| 5,070,824 | 12/1991 | Morishita | 123/315 |
| 5,233,948 | 8/1993 | Boggs et al. | 123/432 |
| 5,253,620 | 10/1993 | Dohn et al. | 123/432 |
| 5,603,292 | 2/1997 | Hakansson | 123/568 |

FOREIGN PATENT DOCUMENTS

| 53-40115 | 4/1978 | Japan . |
| 54-129219 | 10/1979 | Japan . |
| 57-51536 | 11/1982 | Japan . |
| 61-85515 | 5/1986 | Japan . |
| 63-277815 | 11/1988 | Japan . |
| 2-135604 | 11/1990 | Japan . |
| 3-55643 | 8/1991 | Japan . |
| 4-175453 | 6/1992 | Japan . |
| 4-301172 | 10/1992 | Japan . |
| 5-80561 | 11/1993 | Japan . |

Primary Examiner—David A. Okonsky
Attorney, Agent, or Firm—Sidley & Austin

[57] ABSTRACT

The present invention is a variable compression ratio engine which can operate both in a Miller cycle and a normal cycle, and which can produce a high output, reduce the generation of NOx, and prevent the occurrence of knocking. For this purpose, the engine is provided with an exhaust gas recirculating device equipped with a first cam shaft (10), provided with cams (11, 12, 13) for operating an intake valve (2) and exhaust valves (4, 5), and a second cam shaft (20), provided with cams (21, 22) for operating at least one intake valve (3) and an exhaust valve (5) to thereby recirculate part of exhaust gas into intake gas.

13 Claims, 17 Drawing Sheets

90° BEFORE BOTTOM DEAD CENTER

| COMPRESSION RATIO | 17 | | | 12 | | |
|---|---|---|---|---|---|---|
| AVERAGE AXIAL EFFECTIVE PRESSURE | 13 | 21 | 34 | 13 | 21 | 34 |
| BOOST PRESSURE | 2 | 3.1 | 5 | 2 | 3.1 | 5 |
| COMPRESSION PRESSURE | 97 | 150 | 242 | 60 | 93 | 150 |
| EXPLOSION DEGREE | 1 | 1 | 1 | 1 | 1 | 1 |
| CYLINDER PRESSURE Pmax | 97 | 150 | 242 | 60 | 93 | 150 |

VARIABLE COMPRESSION RATIO ENGINE

TECHNICAL FIELD

The present invention relates to a variable compression ratio engine, and more particularly, to a variable compression ratio engine which can convert between an ordinary cycle and a Miller cycle.

BACKGROUND ART

In order to reduce NOx contained in exhaust gas, exhaust gas recirculation (EGR), by which exhaust gas, which is an inert gas, is recirculated into an intake gas and by which the combustion temperature is lowered, has been conventionally conducted in vehicle engines. Regarding this exhaust gas recirculation, when the load on an engine is heavy, the volume efficiency is improved as the temperature of EGR gas becomes lower, and the combustion temperature becomes lower and the NOx decreases as there is a larger amount of EGR gas. On the other hand, when the load on an engine is light, the combustion is not stable when the temperature of the EGR gas is low, so that an EGR gas with a high temperature is preferable. For this reason, a method of controlling the EGR gas to be cooled when the load is heavy and of controlling the EGR gas so that the EGR gas is not cooled when the load is light, by providing an EGR gas cooling means, is already known (for example, refer to Japanese Patent Application Laid-open No. 4-175453 and Japanese Patent Application Laid-open No. 4-301172).

However, when the EGR is conducted with a heavy load, disadvantages of increased fuel consumption, reduced output, etc., are brought about.

In other conventional art, many of the compression ratios of engines, for example, direct injection type diesel engines are set in the vicinity of 15 to 17. This compression ratio is required for securing starting efficiency and a good combustion state when a load is light, for example, a combustion state without blue and white smoke including hydrocarbon compounds, etc. The times for opening and closing an intake valve are fixed in order that the aforementioned compression ratio is obtained. When the compression ratio is determined, the pressure within a cylinder chamber at the end of the compression stroke is determined, and the pressures within the cylinder chamber at ignition, explosion, etc., are also determined. Meanwhile, a maximum allowable pressure within a cylinder chamber is determined in accordance with the engine, and the higher the compression ratio is, the higher the pressure within a cylinder chamber becomes at the end of compression. Accordingly, the difference between this pressure within a cylinder chamber and the maximum allowable pressure within a cylinder chamber lessens, and this is the main factor which prevents an engine from outputting high power.

The aforementioned compression ratio is desired to be in the vicinity of 11 to 13, from the viewpoint of combustion efficiency and high power output. As an example, average axial effective pressures, which can be achieved with the compression ratios at 17 and 12, are shown in FIG. 27. A unit of pressure in FIG. 27 is $kgf/cm^2$. For example, in the case of an engine with a maximum allowable pressure within the cylinder, Pmax, of 150 $kgf/cm^2$ or less (Pmax$\leq$150 $kgf/cm^2$), the average axial effective pressure stays at 21 $kgf/cm^2$ with the compression ratio of 17; but with the compression ratio of 12, the average axial effective pressure can be 34 $kgf/cm^2$, that is, high power can be outputted.

However, since it is an absolutely necessary condition to obtain an excellent starting and an excellent combustion state when the load is light, in the current state, the compression ratio is set in the vicinity of 15 to 17 and high power output is sacrificed. This is also the case in gasoline engines, and though the compression ratio is desired to be 11 to 13 as in the diesel engines from the view of combustion efficiency (thermal efficiency), the compression ratio is set at 8 to 10 in order to prevent the occurrence of knocking when the load is heavy. As a result, there are disadvantages of increasing fuel consumption and of generating a large amount of $CO^2$.

As the art which improves thermal efficiency of diesel engines and which reduces exhaust emission, a Miller cycle engine, by which a low compression ratio and a high expansion ratio can be obtained, has been known. There are two types of Miller cycle engines; a type which blocks the flow of intake gas in the middle of an intake stroke by closing an intake valve at an early stage, and a type which lets intake pressure escape at the beginning of a compression stroke by closing the intake valve at a latter stage. However, as described above, when a Miller cycle is operated at a low speed and in a light load range of the engine, the effective compression ratio is reduced, and therefore there has been a disadvantage of unstable ignition.

As a means of eliminating this disadvantage, there is the Miller cycle engine described below (refer to, for example, Japanese Patent Application Laid-open No. 63-277815). In FIG. 28, an intake valve 60 is opened and closed by the medium of a crankshaft, timing gear, cam shaft, tappet, push rod, and rocker arm, which are not illustrated in the drawing. At the middle of an upstream passage 61 of the intake valve 60, a new valve 62 is provided, and the engine speed, a load, etc., are detected as signals. Based on this detection, the valve 62 is closed, earlier than the intake valve 60 is closed, by a valve mechanism 63 connecting to a conversion mechanism 64 according to the driving conditions; in other words, an early closing Miller cycle operation is conducted. 66 is an exhaust valve, and 67 is a cylinder chamber. The valve 62 and the valve mechanism 63 may be rotary valves.

FIG. 29A and FIG. 29B show the relationship between the position of a piston (axis of abscissa) of the aforementioned engine and the area of the opening, and the curve A corresponds to the exhaust valve 66, the curve B corresponds to the intake valve 60, and C, shown by two lines, corresponds to the valve 62. As shown in FIG. 29A, when the load is light, the intake valve 60 and the valve 62 open and close at the same time, so that the area of the opening of the intake valve 60 is represented by the hatched portion, and the engine operates in a normal cycle. On the other hand, when the load is heavy, the valve 62 opens and closes earlier, as much as S as FIG. 29B shows, and the actual opening area of the intake valve 60 is represented by the hatched portion. Accordingly, the intake valve 60 closes early with the actual compression ratio being low, so that the engine operates in an early closing Miller cycle, and a high power can be outputted.

However, even if the valve 62 is closed by operating the engine in a Miller cycle as described above, the amount of air in the passage 65 between the intake valve 60 and the valve 62 is added to the amount of air in the cylinder 67 when the intake valve 60 opens. Accordingly the volume increases, so that the effect of closing the valve 62 in the middle of the intake stroke is decreased, and the effect of the Miller cycle is reduced. There is a disadvantage of a pumping loss caused by an increase of intake resistance immediately before the valve 62 closes and by the comings and goings of intake gas resulting from the amount of air in the passage 65 becoming an excessive volume.

Further, in each type of engine, it is an important art to make the opening and closing times of the valves variable in order to obtain high torque generated over a large rotational range. For example, as a practical method of making a valve timing variable, a method of changing a phase of a timing gear and a cam shaft, by engaging the cam shaft with the timing gear by the medium of a helical spline and by moving the timing gear in an axial direction, has been known (refer to, for example, Japanese Patent Application Laid-open No. 61-85515).

However, though high torque can be obtained over a wide range in the aforementioned structure, the angle variations of the cam shaft cannot normally be made to be 20° to 40° or more at a crank angle, so that it is difficult to make a helical angle of the helical spline extremely large. Accordingly, in order to convert between a normal cycle (an Otto-cycle, a diesel cycle, etc.) and a Miller cycle by changing the opening and closing times of the valves in order to output high power, the angle variations of the cam shaft need to be 70° to 90° at the crank angle, and the conventional helical spline type is insufficient.

SUMMARY OF THE INVENTION

In order to eliminate the aforementioned disadvantages of the conventional art, an object of the present invention is to provide a variable compression ratio engine which can convert between a normal cycle and a Miller cycle, and which has a sufficient effect of a Miller cycle. Another object is to always conduct a most suitable EGR over a wide driving range of an engine by increasing the EGR rate (the amount of EGR gas supply) under a light load and by decreasing the EGR rate under a heavy load.

The first aspect of the variable compression ratio engine relating to the present invention is characterized by including an exhaust gas recirculating device equipped with a first cam shaft, provided with cams for operating an intake valve and exhaust valves, and a second cam shaft, provided with cams for operating at least one intake valve and an exhaust valve, and by including a valve driving device by which the closing time of the intake valves in the intake stroke at a specified driving time, is set at a time before a piston is at the bottom dead center, with the opening and closing times of the exhaust valve being set at a time when the piston is in the vicinity of the top dead center; and by which, in the intake stroke under a light load, the closing time of at least one intake valve is set at a time when the piston is in the vicinity of the bottom dead center, with the opening and closing times of the exhaust valve being set at a time before the piston is at the bottom dead center, to thereby recirculate part of the exhaust gas into intake gas when a load is light, by changing the phase of the cams on the second cam shaft by the valve driving device, in a variable compression ratio engine which is provided with at least two intake valves and at least one exhaust valve per cylinder and which changes the compression ratio by opening and closing the intake valves and/or the at least one exhaust valve by cams provided on at least two cam shafts (the present structure shall be the first setting of the opening and closing times of the valves).

The aforementioned valve driving device can be a valve driving device by which, in the intake stroke under a light load, the closing time of the intake valves can be set at a time when the piston is in the vicinity of the bottom dead center, with the opening and closing times of the exhaust valve being set at a time before the piston is at the bottom dead center, and by which the closing time of at least one intake valve can be set at a time after the piston is at the bottom dead center, with the opening and closing times of the exhaust valve being set at a time when the piston is in the vicinity of the bottom dead center, and this valve driving device can recirculate part of the exhaust gas into intake gas under a light load by changing the phase of the cams on the second cam shaft (the present structure shall be the second setting of the opening and closing times of the valves).

By the aforementioned structure, in the case of the first setting of the opening and closing times of the valves, under a heavy load, the engine operates in an early closing Miller cycle with a low compression ratio, so that the exhaust gas recirculation is hardly conducted; and under a light load, the engine operates in a normal cycle with a high compression ratio, so that the exhaust gas recirculation is conducted. In the case of the second setting of the opening and closing times of the valves, under a light load, the engine operates in a normal cycle with a high compression ratio, so that the exhaust gas recirculation is conducted; and under a heavy load, the engine operates in a late closing Miller cycle with a low compression ratio, so that the exhaust gas recirculation is hardly conducted.

Next, the second aspect of the variable compression ratio engine is characterized by including an intake device which changes the valve timing of at least one of the intake valves by changing the phase of the cam for opening and closing the intake valve, to thereby set the closing time of the intake valves at a time before the piston is at the bottom dead center, and to thereby, at a specified driving time, set the closing time of at least one of the intake valves at a time when the piston is in the vicinity of the bottom dead center. The closing time of the intake valves which is set at the time before the piston is at the bottom dead center can be at a time when a crank rotational angle is in the range of 20° to 90° before the piston is at the bottom dead center.

By the aforementioned structure, at a specified driving time, for example, at a starting time or under a light load, the compression ratio can be increased, so that an excellent start or combustion state can be secured. When the closing time of the intake valves is set in the range of 20° to 90° before the piston is at the bottom dead center, the compression ratio can be reduced, so that the pressure within a cylinder chamber at the end of the compression is lowered. Accordingly, a margin up to the maximum allowable pressure is made, so that high power can be outputted.

Next, the third aspect of the variable compression ratio engine is characterized by including an exhaust gas recirculating device equipped with a first cam shaft, provided with the cams operating the intake valve and the exhaust valves, and the second cam shaft, provided with cams for operating at least one of the intake valves and the exhaust valve; a planetary gear unit equipped with a sun gear, a ring gear which is fixedly attached to the first cam shaft, a gear which is meshed with this ring gear and fixedly attached to the second cam shaft, and a planet gear, and a variable valve timing device which changes the valve timing by adjusting the phases of the first and the second cam shafts by freely changing a relative positional relationship between a support shaft of a planet gear and a shaft of the sun gear, so that part of the exhaust gas is recirculated into intake gas by operating the variable valve timing device.

By the aforementioned structure, the relative positional relationship between the support shaft of a planet gear and the shaft of the sun gear can be changed to be a different positional relationship by operating the variable valve timing device. Accordingly, the phase of one cam shaft can be changed with respect to the other cam shaft, so that the exhaust gas recirculating device can be operated. By this mechanical structure, the exhaust gas recirculation can be conducted when needed as in the first aspect of the invention.

BRIEF DESCRIPTION OF DRAWINGS

FIG. 20A and FIG. 20B are PV diagrams for comparing the PV diagrams relating to the third embodiment, wherein FIG. 20A shows the PV diagram when the engine is started and under a light load and FIG. 20B shows the PV diagram under a heavy load;

FIG. 29A is a graph with a light load and FIG. 29B is a graph with a heavy load.

BEST MODE FOR CARRYING OUT THE INVENTION

A preferable embodiment of the variable compression ratio engine relating to the present invention will be described below in detail with reference to the attached drawings.

Figure 1:
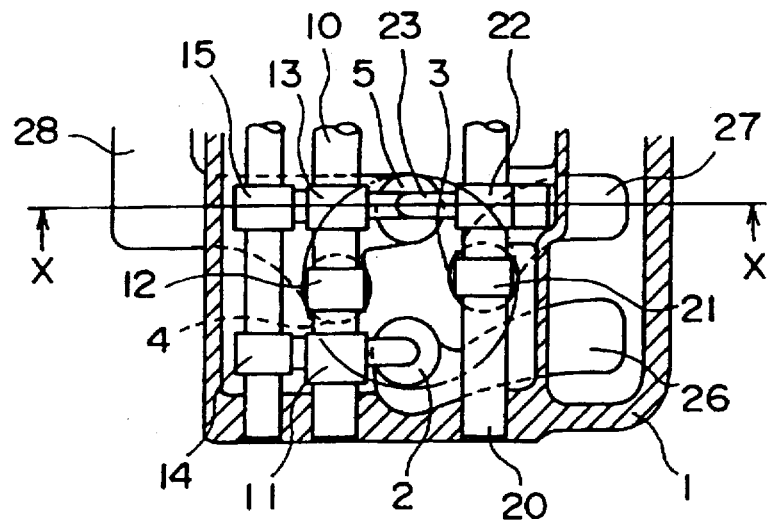
FIG. 1 is a transverse cross-sectional view of a cylinder head portion of a diesel engine which is provided with the exhaust gas recirculating device relating to the first embodiment of the present invention.
Figure 2:
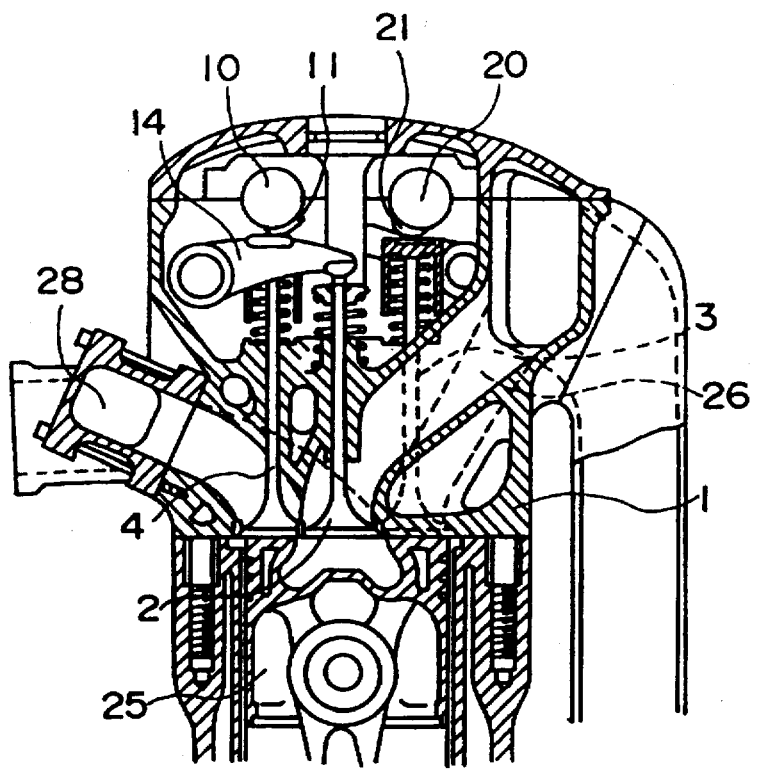
FIG. 2 is a longitudinal sectional view of the engine in FIG. 1.
Figure 3:
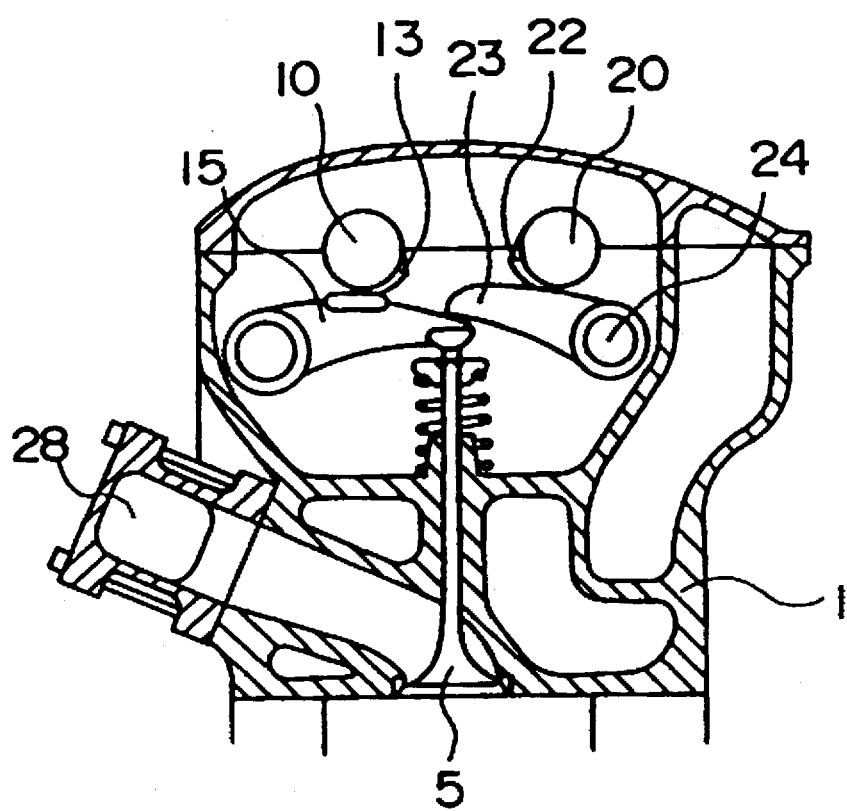
FIG. 3 is a longitudinal sectional view of the exhaust gas recirculating device of the engine along line X—X of FIG. 1.

FIG. 1 to FIG. 3 show a diesel engine, provided with the exhaust gas recirculating device relating to the first embodiment, and each cylinder has two intake valves and two exhaust valves. At a cylinder head 1, a first intake valve 2, a second intake valve 3, a first exhaust valve 4, a second exhaust valve 5, a first cam shaft 10, and a second cam shaft 20 are placed. At the first cam shaft 10, cams 11, 12, and 13 are provided for the first intake valve 2, the first exhaust valve 4, and the second exhaust valve 5, and the cam 12 directly operates the first exhaust valve 4. The cams 11 and 13 respectively operate the first intake valve 2 and the second exhaust valve 5 by the medium of rocker arms 14 and 15.

At the second cam shaft 20, cams 21 and 22 are provided, and the cam 21 directly operates the second intake valve 3. The cam 22 operates the rocker arm 15, by oscillating a lever 23 placed at the cylinder head 1 with a pin 24 as its center, to open and close the second exhaust valve 5. The second cam shaft 20 is rotated to an angle previously specified by a driving device, which is not illustrated in the drawings and which can change the phases of the cams 21 and 22. Thereby the valve timing of the second intake valve 3 and the second exhaust valve 5 can be delayed. 25 is a piston, 26 and 27 are intake passages, and 28 is an exhaust passage.

The operation by the aforementioned structure will be described.

Figure 4:
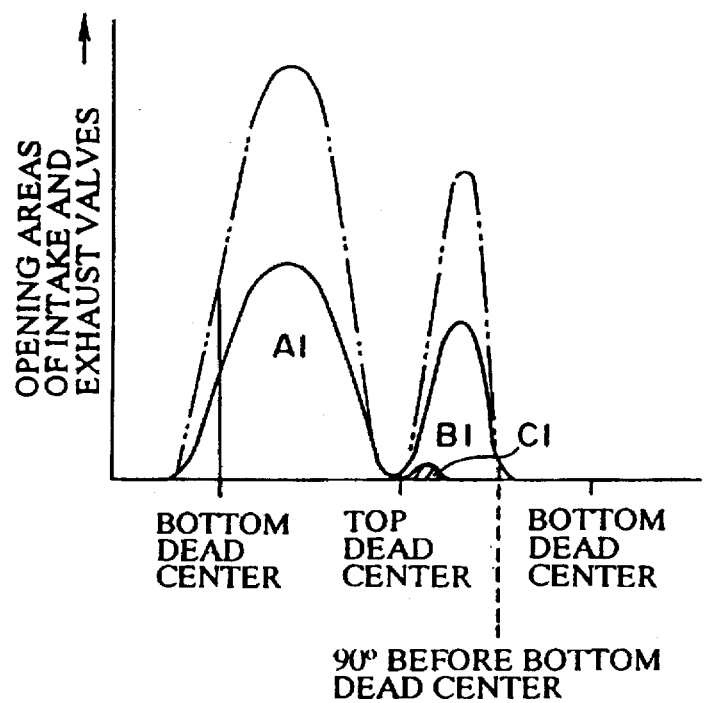
FIG. 4 is a graph showing the relationship between the movement of the piston and the opening areas of the intake and exhaust valves under a heavy load on the engine relating to the first embodiment.

In FIG. 4, the axis of abscissa shows the position of the piston 25, the solid line shows the opening area of one valve, the two-dot chain line shows the total opening areas of two valves, A1 shows one exhaust valve, B1 shows one intake valve, and C1 shows the second exhaust valve. The first and second exhaust valves 4 and 5 start to open before the piston 25 is at the bottom dead center and close when the piston 25 is in the vicinity of the top dead center, and always have the same phases. The first and second intake valves 2 and 3 start to open when the piston 25 is in the vicinity of the top dead center and close when the piston 25 is in the vicinity of 90° before the bottom dead center, and have the same phases. At the same time, the second intake valve 3 opens when the piston 25 is in the vicinity of the top dead center, the second exhaust valve 5 opens for a short time, as C1 shows. However, since the second exhaust valve 5 opens when the piston 25 is in the vicinity of the top dead center, most of the exhaust gas does not recirculate into the intake gas, so that there is no possibility that the fuel consumption increases or that the output is reduced.

Figure 5:
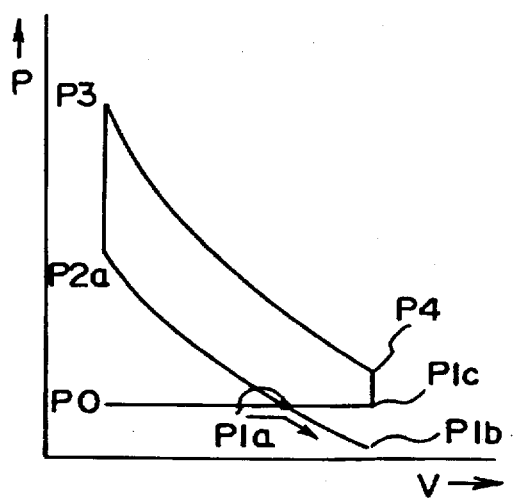
FIG. 5 is a PV diagram for a heavy load on the engine relating to the first embodiment.

FIG. 5 shows the state under a heavy load, and in the intake stroke, intake is started at P0, and at P1a the first and the second intake valves 2 and 3 close, so that the pressure within the cylinder decreases and goes along the arrow to P1b. In the compression stroke, the pressure within the cylinder reaches P2a via P1b and P1a, in the combustion and expansion strokes, the pressure goes to P3 from P2a and then to P4, and in the exhaust stroke, the pressure goes to P1c from P4 and then to P0. In short, the engine operates in an early closing Miller cycle. At almost the end of the intake stroke, only the expansion and compression from P1a to P1b to P1a are conducted, so that the actual compression ratio is reduced to be as low as 11 to 13. Accordingly, high power can be outputted.

Figure 6:
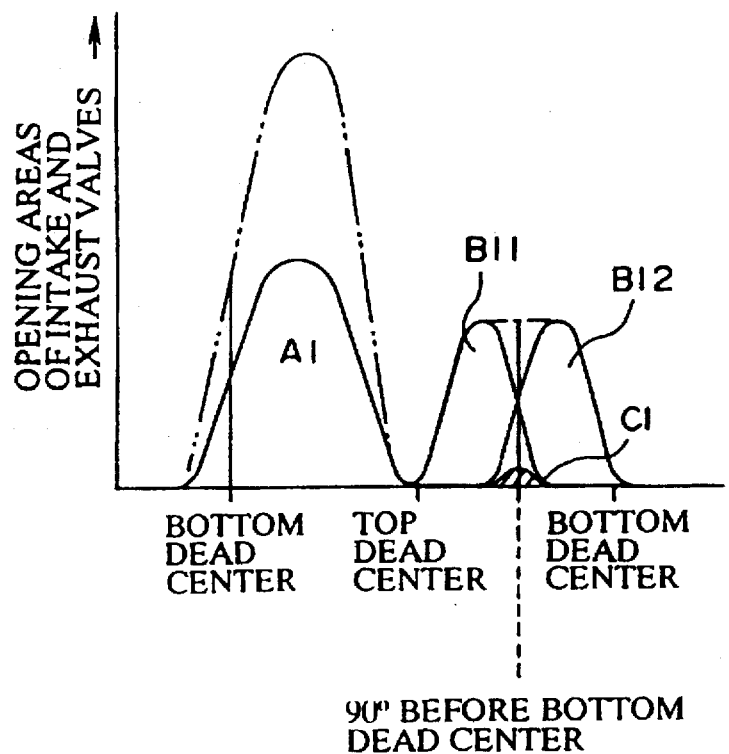
FIG. 6 is a graph showing the relationship between the movement of the piston and the opening areas of the intake and exhaust valves under a light load on the engine relating to the first embodiment.

On the other hand, when the load is light, the phases of the cams 21 and 22 are changed, as in FIG. 1, by rotating the second cam shaft 20 by the driving device, and the closing time of the second intake valve 3 is set at as late as the time when the piston 25 is in the vicinity of the bottom dead center. In FIG. 6, showing the variation of the opening area under a light load, B11 shows the first intake valve 2, and B12 shows the second intake valve 3. Accordingly the second exhaust valve 5 is at the position shown in C1, that is, in the vicinity of 90° before the piston is at the bottom dead center, and exhaust gas is recirculated into the intake gas. As a result, the EGR rate becomes high, so that the generation of NOx is reduced.

Figure 7:
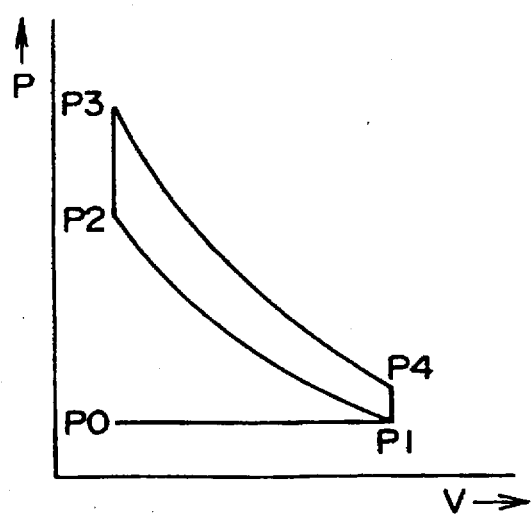
FIG. 7 is a PV diagram for a light load on the engine relating to the first embodiment.

FIG. 7 is a PV diagram under a light load, and the engine operates in a normal cycle with the intake stroke from P0 to P1, the compression stroke from P1 to P2, the combustion stroke from P2 to P3, the expansion stroke from P3 to P4, and the exhaust stroke from P4 to P1 to P0. The compression ratio in this cycle is 15 to 17, and an excellent start and combustion state can be obtained.

Figure 8:
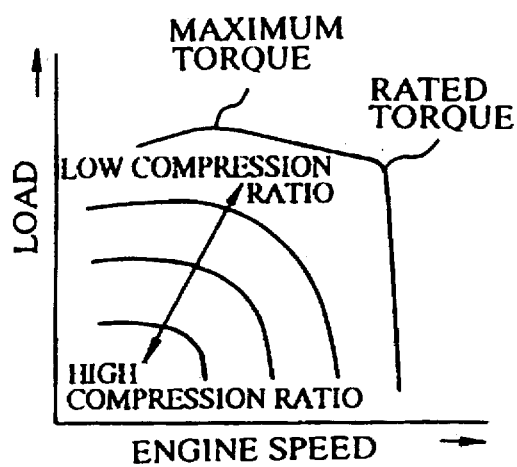
FIG. 8 is a graph showing the relationship between the variation of the compression ratio and the load on the engine relating to the first embodiment.
Figure 9:
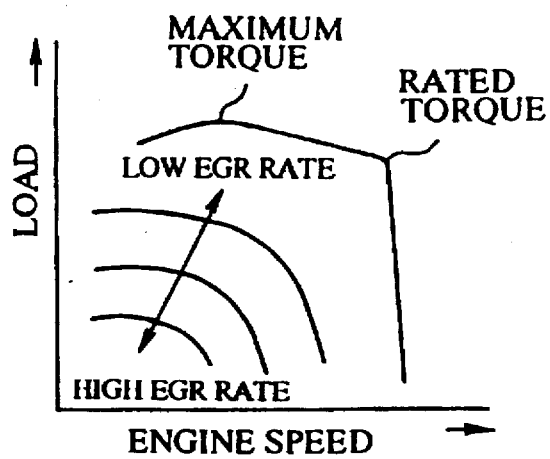
FIG. 9 is a graph showing the relationship between the variation of the EGR rate and the load on the engine relating to the fist embodiment.

The relationship between the aforementioned load on the engine and the compression ratio or the EGR rate will be described. In FIG. 8, the most external curve is a torque curve when the engine outputs the maximum power. As shown in the drawing, when the load becomes heavier, the compression ratio becomes lower, in other words, when the load is lighter, the compression ratio becomes higher. As shown in FIG. 9, when the load on the engine is lighter, the EGR rate becomes higher.

The second embodiment of the variable compression ratio engine relating to the present invention will now be described in detail with reference to the attached drawings.

Figure 10:
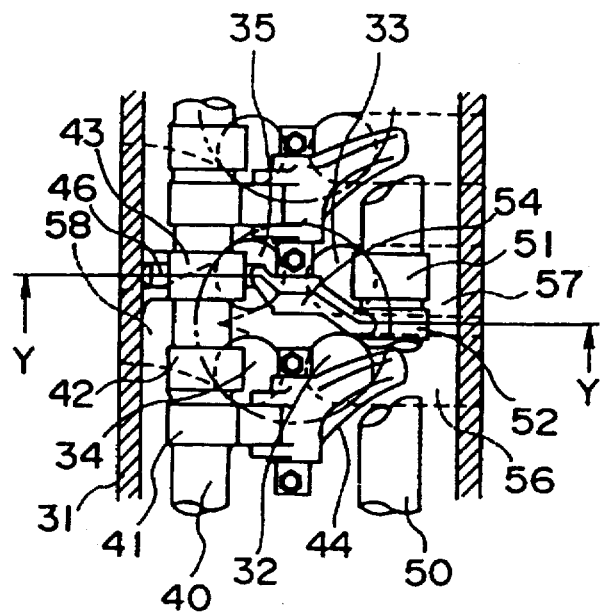
FIG. 10 is a transverse cross-sectional view of a cylinder head of a gasoline engine provided with the exhaust gas recirculating device relating to the second embodiment of the present invention.
Figure 11:
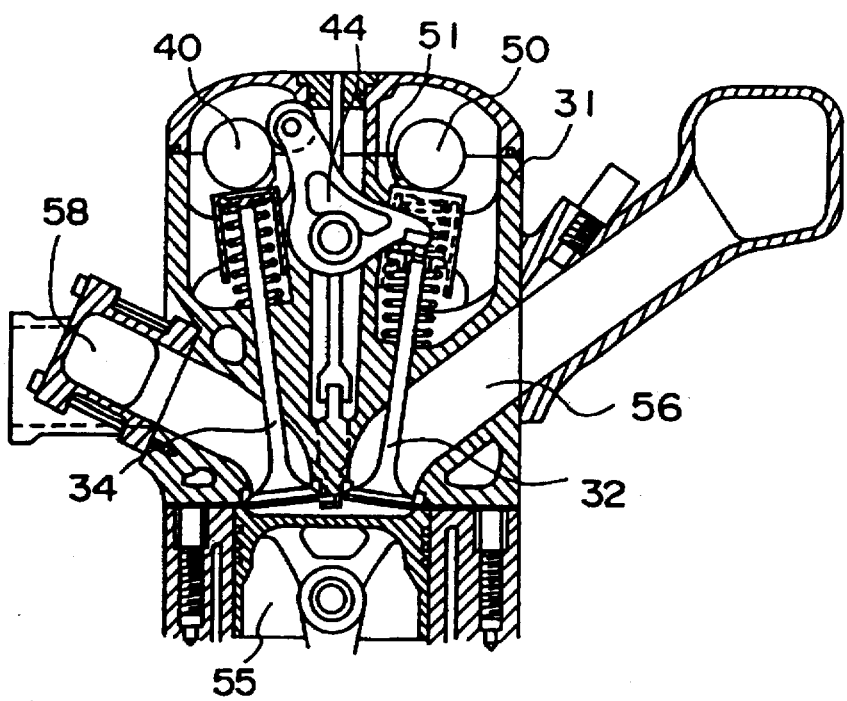
FIG. 11 is a longitudinal sectional view of the engine in FIG. 10.
Figure 12:
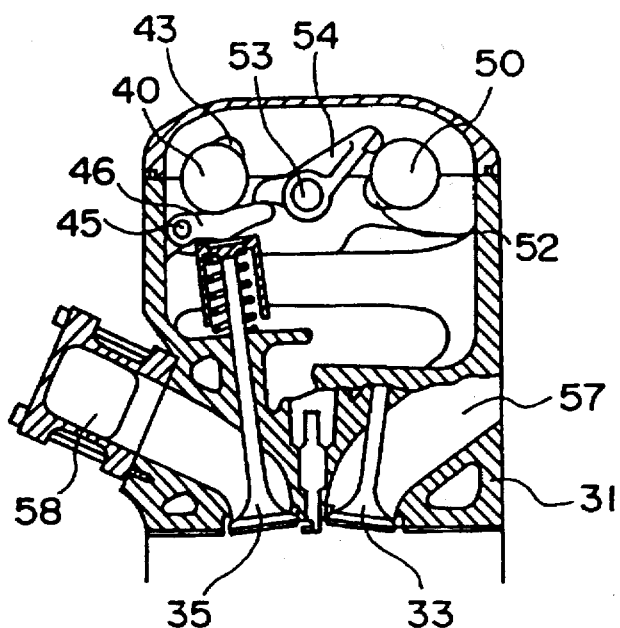
FIG. 12 is a longitudinal sectional view of the exhaust valve driving device of the engine along line Y—Y of FIG. 10.

FIG. 10 to FIG. 12 show the essential parts of the gasoline engine provided with two intake and two exhaust valves per cylinder. At a cylinder head 31, a first intake valve 32, a second intake valve 33, a first exhaust valve 34, a second exhaust valve 35, a first cam shaft 40, and a second cam shaft 50 are placed. At the first cam shaft 40, the cams 41, 42, and 43 are provided for the first intake valve 32, the first exhaust valve 34, and the second exhaust valve 35. The cam 41 operates the first intake valve 32 by the medium of a rocker arm 44, and the cam 42 directly operates the first exhaust valve 34. The cam 43 operates the second exhaust valve 35 by the medium of a lever 46 attached at the cylinder head 31 by a pin 45 so as to be free to oscillate.

At a second cam shaft 50, cams 51 and 52 are provided, and the cam 51 directly operates the second intake valve 33. The cam 52 oscillates the lever 46, by the medium of a lever 54 attached at the cylinder head 31 by a pin 53 so as to be free to oscillate, to open and close the second exhaust valve 35. The second cam shaft 50 is rotated to an angle previously specified by a driving device, which is not illustrated in the drawing; and by changing the phases of the cams 51 and 52, the valve timing of the second intake valve 33 and the second exhaust valve 35 can be delayed. 55 is a piston, 56 and 57 are intake passages, and 58 is an exhaust passage.

Figure 13:
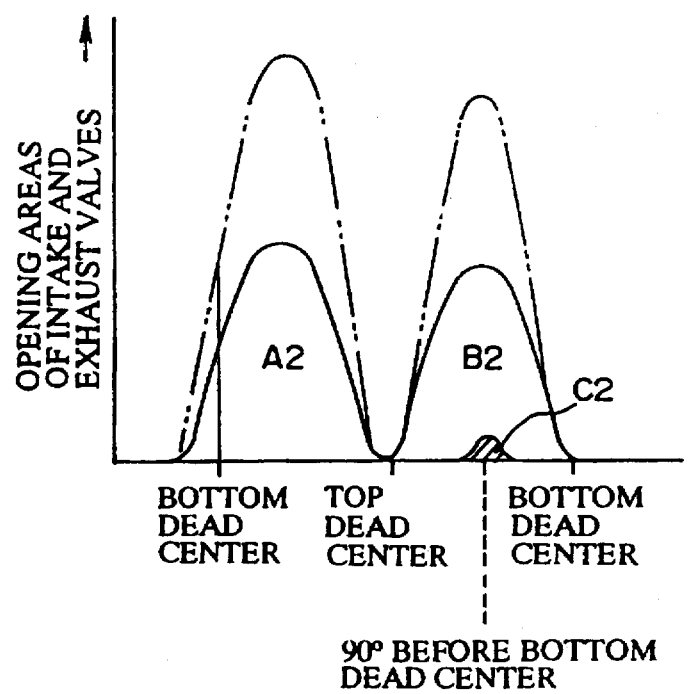
FIG. 13 is a graph showing the relationship between the movement of the piston and the opening areas of the intake and exhaust valves when a light load is on the engine relating to the second embodiment.

The operation by the aforementioned structure will be described. FIG. 13 shows the variation of the opening area when a load is light, and the axis of abscissa shows the position of the piston 55, the solid line shows the opening area of one valve, and the two-dot chain line shows the total opening areas of two valves. A2 corresponds to one exhaust valve, B2 corresponds to one intake valve, and C2 corresponds to the second exhaust valve. The first and second exhaust valves 34 and 35 start to open before the piston 55 is at the bottom dead center, close when the piston 55 is in the vicinity of the top dead center, and have the same phases. On the other hand the first and second intake valves 32 and 33 have the same phases, and start to open when the piston 55 is in the vicinity of the top dead center and close when the piston 55 is in the vicinity of the bottom dead center. The second exhaust valve 35 opens for a short time in the vicinity of 90° before the piston 55 is at the bottom dead center, and exhaust gas is recirculated into the intake gas. Accordingly, the EGR rate increases and generation of NOx is reduced.

The cycle operation from the intake stroke to the exhaust stroke under a light load has the same basic cycle pattern as that in FIG. 7 of the first embodiment. The compression ratio in this cycle operation is in the range of 11 to 13, so that the starting efficiency and thermal efficiency are improved, and the fuel consumption and generation of $CO_2$ can be reduced.

Figure 14:
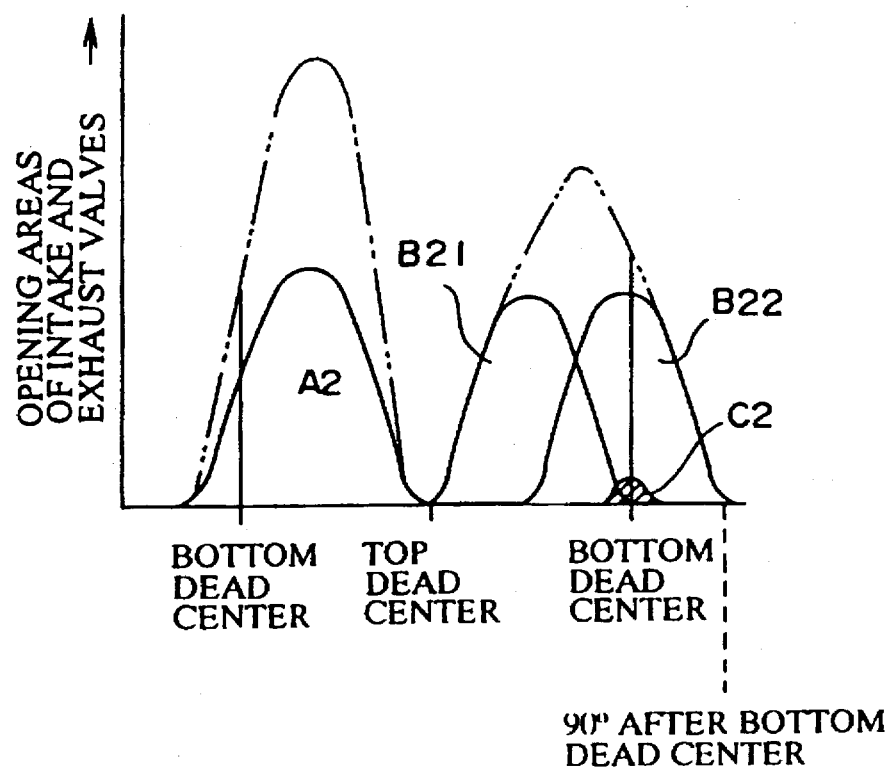
FIG. 14 is a graph showing the relationship between the movement of the piston and the opening areas of the intake and exhaust valves when a heavy load is on the engine relating to the second embodiment.

FIG. 14 shows the variation of the opening area under a heavy load, and A2 corresponds to one exhaust valve, B21 corresponds to the first intake valve 32, B22 corresponds to the second intake valve 33, and C2 corresponds to the second exhaust valve 35. Under the aforementioned heavy load, the second cam shaft 50 is rotated by a driving device, which is not illustrated in the drawing, and the second intake valve 33 closes at the position of 90° after the piston is at the bottom dead center. Accordingly, the second exhaust valve 35 opens and closes when the piston 55 is in the vicinity of the bottom dead center, so that almost none of the exhaust gas recirculates into the intake gas. Therefore an increase in fuel consumption and reduction of output can be prevented.

Figure 15:
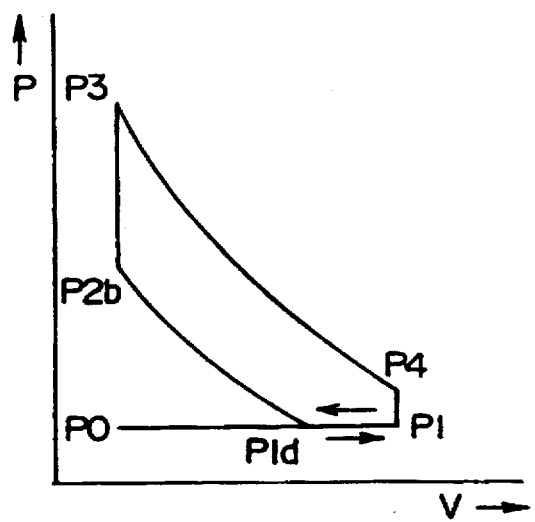
FIG. 15 is a PV diagram when a heavy load is on the engine relating to the second embodiment.

FIG. 15 is a PV diagram under a heavy load, and an intake of gas is conducted in the intake stroke from P0 to P1. In the compression stroke, the pressure does not increase from P1 to P1d since the second intake valve 33 opens, and due to the result that the second intake valve 33 closes at the point P1d, the pressure increases from P1d to P2b. To this stroke, the combustion stroke from P2b to P3, the expansion stroke from P3 to P4, and the exhaust stroke from P4 to P1 to P0 follow, and the engine operates in a late closing Miller cycle. The compression ratio at this time is 8 to 10, so that the high power can be outputted and the occurrence of knocking under a high output is prevented.

The third embodiment of the variable compression ratio engine relating to the present invention will now be described in detail with reference to the drawings.

Figure 16:
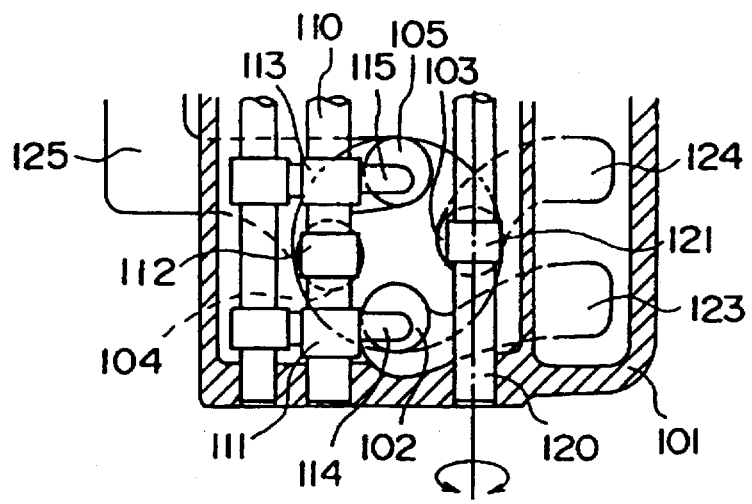
FIG. 16 is a transverse cross-sectional view of a cylinder head portion of the diesel engine relating to the third embodiment of the present invention.
Figure 17:
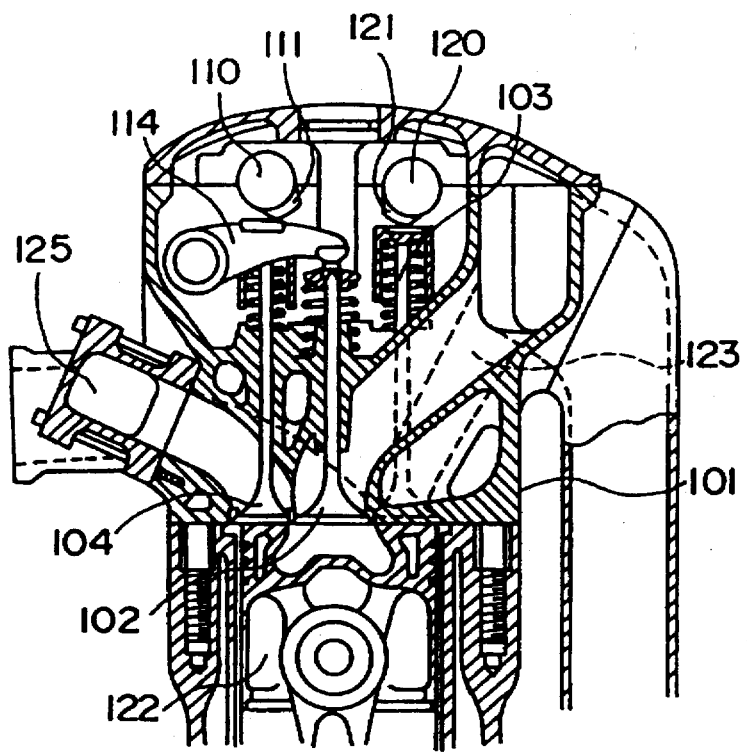
FIG. 17 is a longitudinal sectional view of the engine in FIG. 16.

FIG. 16 and FIG. 17 show a diesel engine having two intake valves and two exhaust valves for each cylinder, and at a cylinder head 101, a first intake valve 102, a second intake valve 103, a first exhaust valve 104, a second exhaust valve 105, a first cam shaft 110, and a second cam shaft 120 are placed. At the first cam shaft 110, the cams 111, 112, and 113 are provided for the first intake valve 102, the first exhaust valve 104, and the second exhaust valve 105. The cam 112 directly operates the first exhaust valve 104, and the cams 111 and 113 operate the first intake valve 102 and the second exhaust valve 105 by the medium of rocker arms 114 and 115.

At a second cam shaft 120, a cam 121 is provided and directly operates the second intake valve 103. The second cam shaft 120 is rotated to an angle previously specified by a driving device, which is not illustrated in the drawings, and the valve timing of the second intake valve 103 can be delayed by changing the phase of the cam 121. 122 is a piston, 123 and 124 are intake passages, and 125 is an exhaust passage.

The operation by the aforementioned structure will be described.

Figure 18:
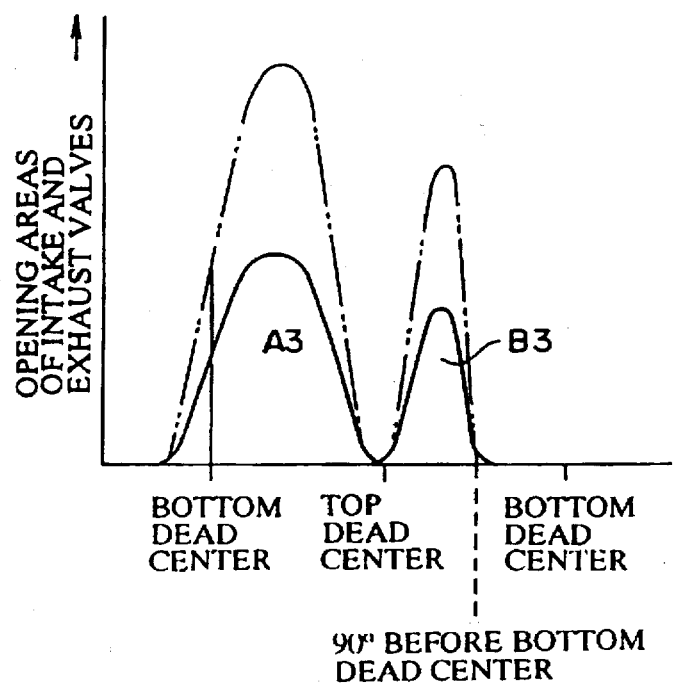
FIG. 18 is a graph showing the relationship between the movement of the piston and the opening areas of the intake and exhaust valves when a heavy load is on the engine relating to the third embodiment.

FIG. 18 shows the variation of the opening area under a heavy load, the axis of abscissa is the position of the piston 122, the solid line is an opening area of one valve, the two-dot chain line is the total opening areas of two valves. A3 corresponds to one exhaust valve, and B3 corresponds to one intake valve. The first and second exhaust valves 104 and 105 begin to open before the piston 122 is at the bottom dead center and close when the piston 122 is in the vicinity of the top dead center. The phases are always the same. The first and the second intake valves 102 and 103, which have the same phases, begin to open when the piston 122 is in the vicinity of the top dead center and close in the vicinity of 20° to 90° before the piston 122 is at the bottom dead center.

Figures 20A, 20B:
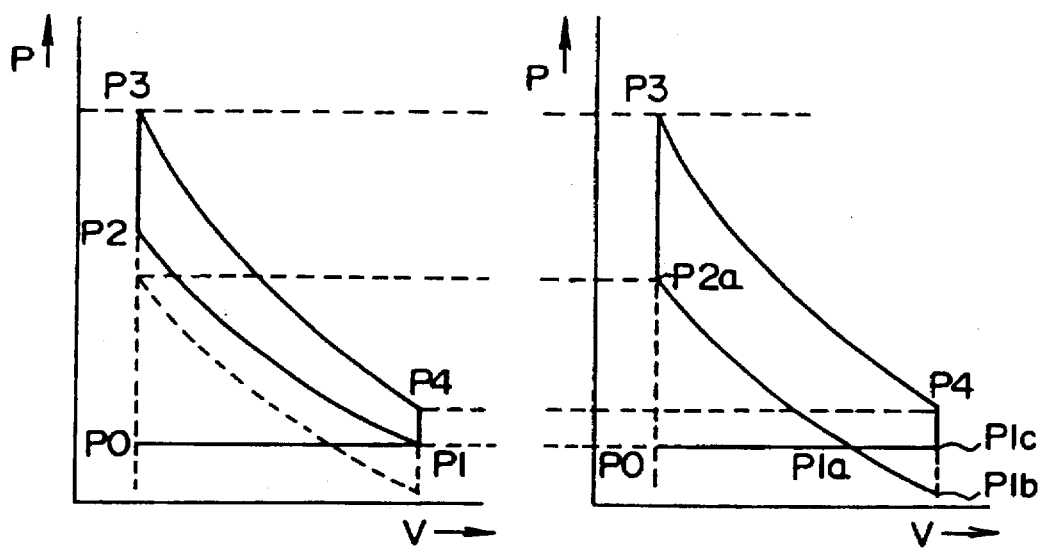

The cycle operation from the intake stroke to the exhaust stroke under a heavy load has the same basic cycle pattern as that in FIG. 5 of the first embodiment, as shown in FIG. 20B. Accordingly the engine operates in an early closing Miller cycle as in the first embodiment under a heavy load, and the actual compression ratio is as low as 11 to 13, so that high power can be outputted.

Figure 19:
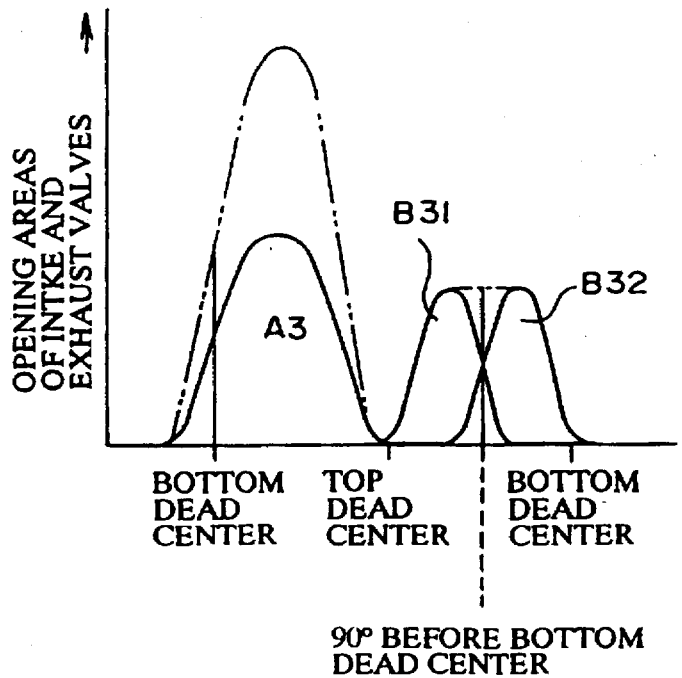
FIG. 19 is a graph showing the relationship between the movement of the piston and the opening areas of the intake and exhaust valves when the engine is started and when a light load is on the engine relating to the third embodiment.

On the other hand, at the starting time and under a light load, the phase of the cam 121 is changed by rotating the second cam shaft 120 by the driving device, and the time when the second intake valve 103 closes is delayed to the time when the piston 122 is in the vicinity of the bottom dead center. In FIG. 19 showing the variation of the opening area in this case, B31 corresponds to the first intake valve 102, and B32 corresponds to the second intake valve 103. Accordingly, the intake valve 102 opens when the piston 122 is in the vicinity of the top dead center and the intake valve 103 close when the piston 122 is in the vicinity of the bottom dead center. From the intake stroke to the exhaust stroke, the basic cycle pattern becomes a nodal cycle operation which is the same as in FIG. 7 of the first embodiment and the compression ratio is 15 to 17.

The difference between the aforementioned state under a heavy load and the state at the starting time or under a light load will be described with reference to FIG. 20A and FIG. 20B. The compression ratio under a heavy load is as small as 11 to 13, so that the compression pressure P2a is lower than P2 and there is a margin up to P3, which is a maximum allowable pressure Pmax of the engine, therefore a lot of fuel can be combusted. As a result, the area surrounded by P1c to P1a to P2a to P3 to P4 under a heavy load is larger than the area surrounded by P1 to P2 to P3 to P4 at the starting time, etc. Accordingly the amount of work done under a heavy load is large and high power is outputted, so that an engine with a small size and with a high output can be realized. Moreover, the intake part has no excessive volume, so that the engine can operate in an efficient Miller cycle. On the other hand, at the starting time and under a light load, the compression ratio is as large as 15 to 17, so that an excellent start and combustion state can be obtained.

Next, the fourth embodiment of the variable compression ratio engine relating to the present invention will be described in detail with reference to the drawings.

Figure 21:
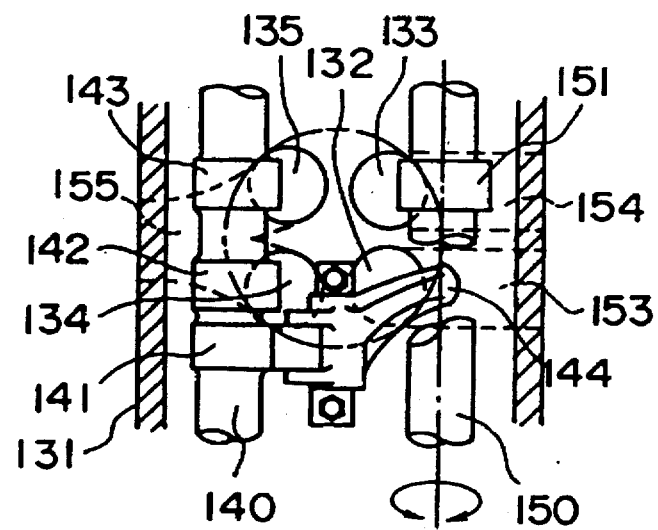
FIG. 21 is a transverse cross-sectional view of a cylinder head portion of the gasoline engine relating to the fourth embodiment of the present invention.
Figure 22:
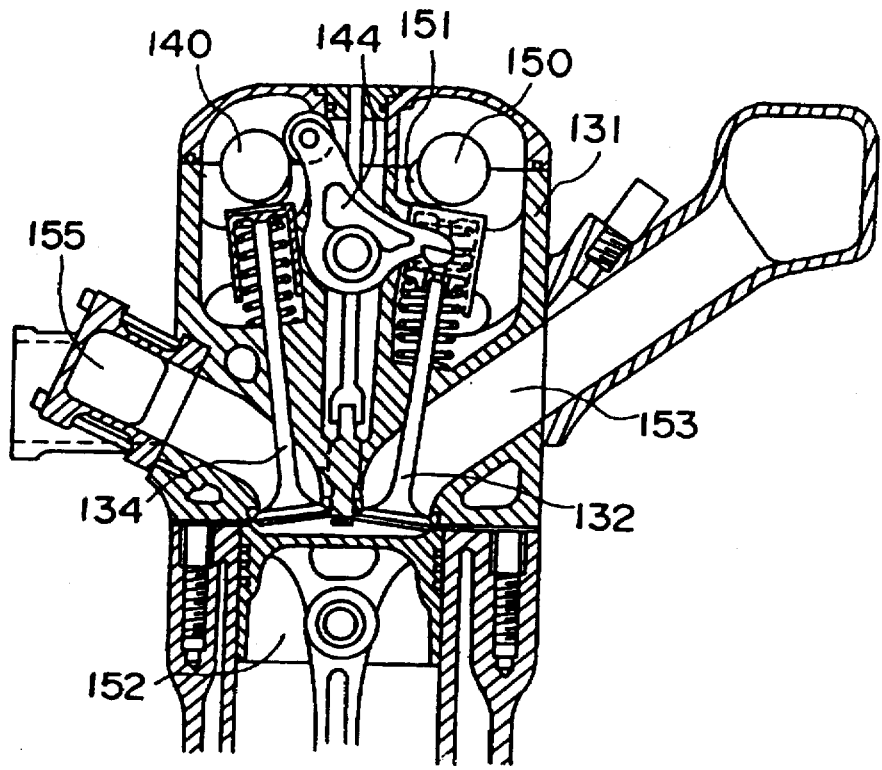
FIG. 22 is a longitudinal sectional view of the engine in FIG. 21.

FIG. 21 and FIG. 22 show the gasoline engine provided with two intake and two exhaust valves for each cylinder, and at a cylinder head 131, a first intake valve 132, a second intake valve 133, a first exhaust valve 134, a second exhaust valve 135, a first cam shaft 140, and a second cam shaft 150 are placed. At the first cam shaft 140, the cams 141, 142, and 143 are provided for the first intake valve 132, the first exhaust valve 134, and the second exhaust valve 135. The cam 141 operates the first intake valve 132 by the of a rocker arm 144, and the cams 142 and 143 directly operate the first exhaust valve 134 and the second exhaust valve 135.

At the second cam shaft 150, a cam 151 is provided and directly operates the second intake valve 133. The second cam shaft 150 is rotated to an angle previously specified by a driving device, which is not illustrated in the drawings and which can delay the valve timing of the second intake valve 133 by changing the phase of the cam 151. 152 is a piston, 153 and 154 are intake passages, and 155 is an exhaust passage.

Figure 23:
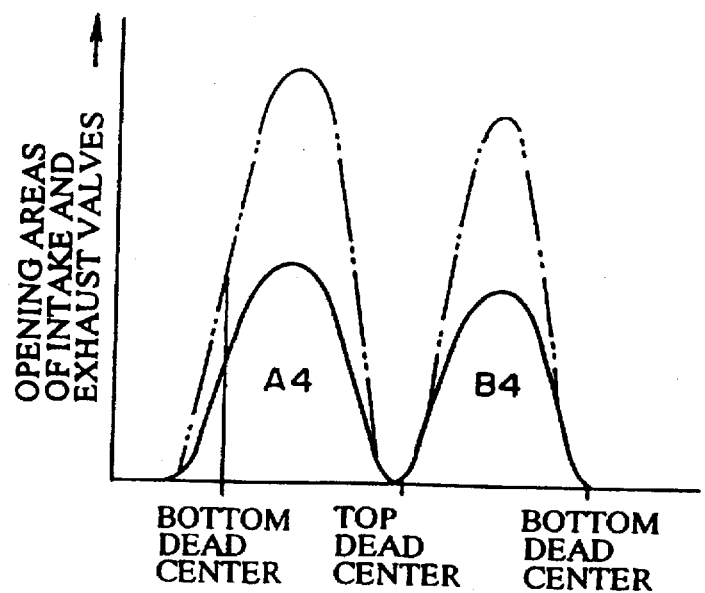
FIG. 23 is a graph showing the relationship between the movement of the piston and the opening areas of the intake and exhaust valves when the engine is started and a light load is on the engine relating to the fourth embodiment.

The operation in the aforementioned structure will be described. In FIG. 23, the solid line is an opening area of one valve, and the fine two-dot chain line shows the total opening areas of two valves, and A4 corresponds to one exhaust valve and B4 corresponds to one intake valve. The first and second exhaust valves 134 and 135 begin to open before the piston 152 is at the bottom dead center, close when the piston 152 is in the vicinity of the top dead center, and always have the same phase. The first intake valve 132 and the second intake valve 133 have the same phase, and begin to open when the piston 152 is in the vicinity of the top dead center, then close when the piston 152 is in the vicinity of the bottom dead center.

From the intake stroke to the exhaust stroke at the starting time and under a light load, the basic cycle pattern is the same normal cycle operation as in FIG. 7 of the first embodiment, and the compression ratio is 11 to 13. Accordingly, like in the second embodiment, the starting efficiency and thermal efficiency are improved, and the fuel consumption and the generation of $CO_2$ can be reduced.

Figure 24:
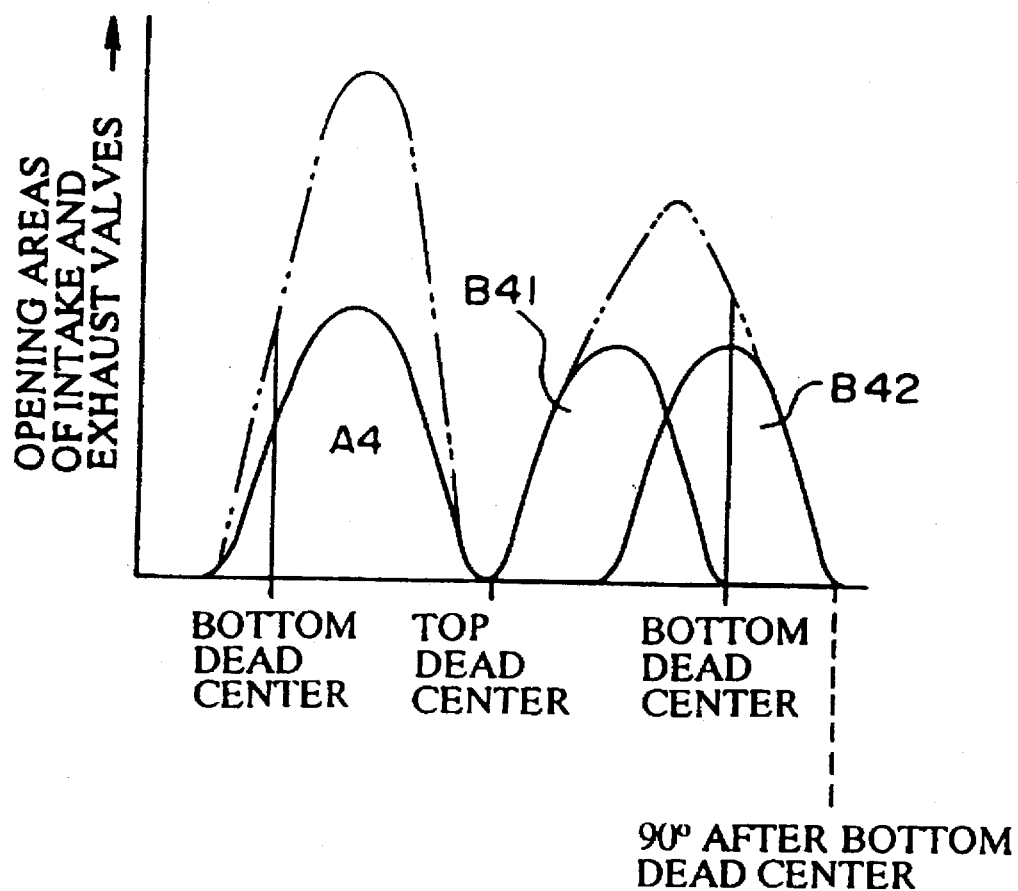
FIG. 24 is a graph showing the relationship between the movement of the piston and the opening areas of the intake and exhaust valves when a heavy load is on the engine relating to the fourth embodiment.

FIG. 24 shows the variation of the opening area under a heavy load, and B41 corresponds to the first intake valve 132, and B42 corresponds to the second intake valve 133. Under the heavy load, the second cam shaft 150 is rotated by a driving device, which is not illustrated in the drawings, so that the second intake valve 133 closes at 40° to 90° after the piston is at the bottom dead center.

From the intake stroke to the exhaust stroke under a heavy load, the basic cycle pattern is the same as in FIG. 15 of the second embodiment, and the engine operates in a late closing Miller cycle. Citing FIG. 15, in the compression stroke from P1 to P1d, the pressure doesn't increase since the second intake valve 133 opens, and as the second intake valve 133 closes at the point P1d, the pressure increases from P1d to P2b. The compression ratio at this time is 8 to 10, and a high power is outputted, and the occurrence of knocking is prevented as in the second embodiment. In addition, the intake part has no excessive volume, so that the efficient variable compression ratio engine can be obtained.

Next, the fifth embodiment of the variable compression ratio engine relating to the present invention will be described in detail with reference to the drawings.

The variable compression ratio engine of the present embodiment is a double overhead camshaft type of engine which can convert between a normal cycle and a Miller cycle, and has the engine in the third embodiment as a base with the variable valve timing device being provided. In FIG. 16, the second cam shaft 120 can be rotated as shown by the arrows by the variable valve timing device described below. By this device, the valve timing can be changed to a degree in the range of 70° to 90° for the crankshaft angle, so that the actual compression ratio is variable and high power can be outputted.

Figure 25:
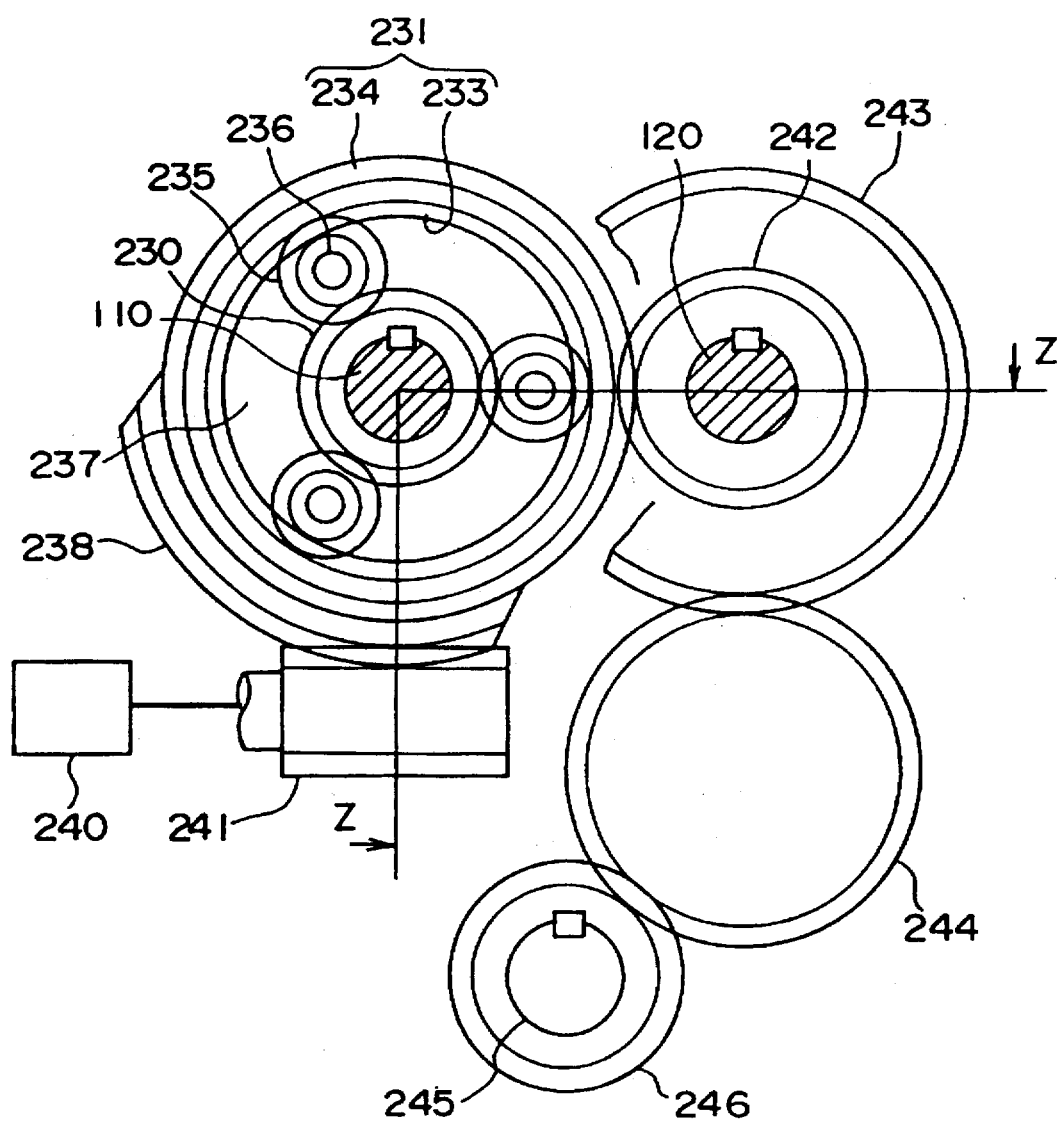
FIG. 25 is an elevational view showing the gear train of the variable valve timing device relating to the fifth embodiment of the present invention.
Figure 26:
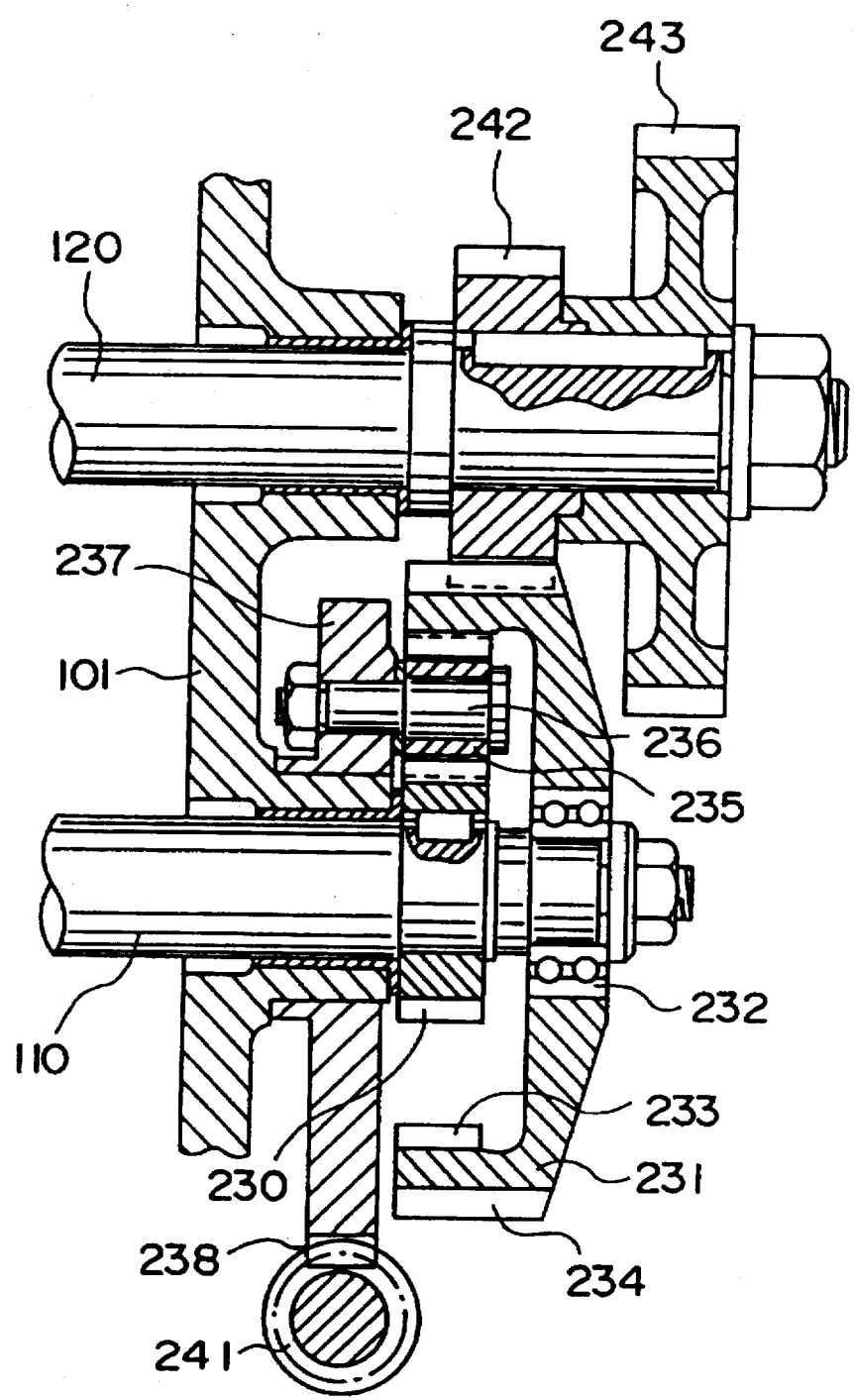
FIG. 26 is a sectional view along line Z—Z of FIG. 25.
Figures 27, 28:
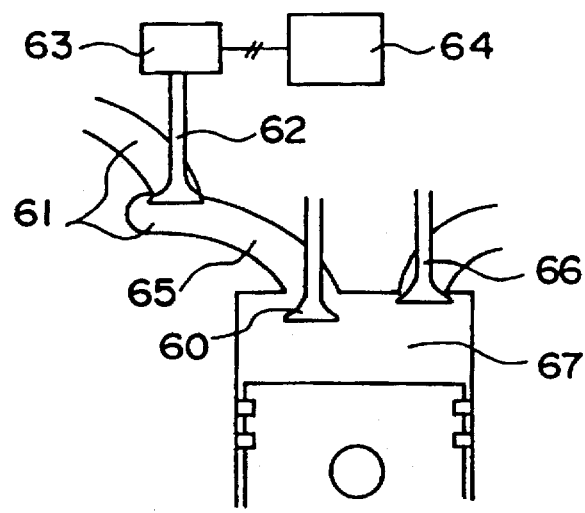
FIG. 27 is a graph showing an average axial effective pressure, etc., at a specified compression ratio of the engine relating to the conventional art.
FIG. 28 is a general view of an early closing Miller cycle engine relating to the conventional art.
Figure 29A:
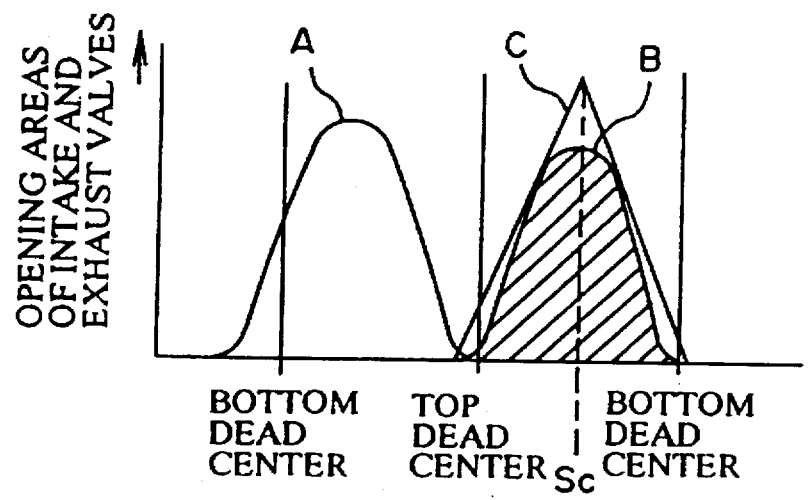
FIG. 29A and FIG. 29B show the relationship between the movement of the piston and the opening areas of the intake and exhaust valves in the engine in FIG. 28.
Figure 29B:
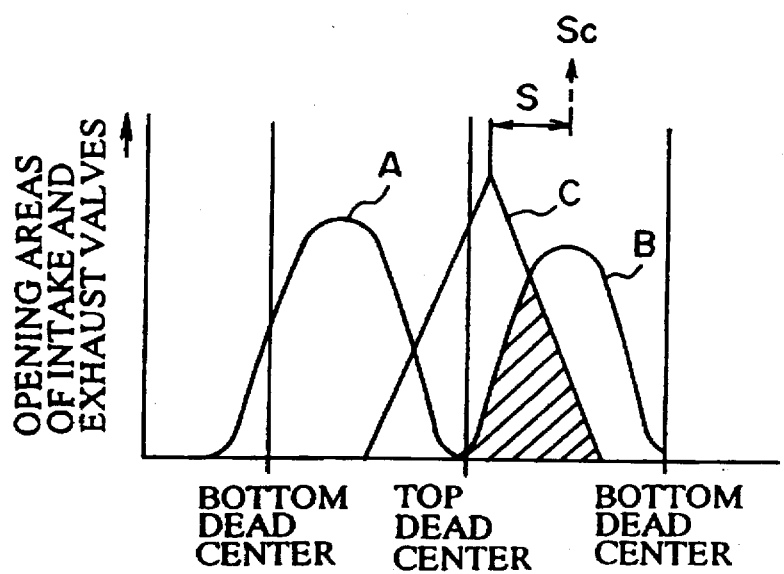

The aforementioned variable valve timing device will be described. FIG. 25 and FIG. 26 show a gear train placed at the end portions of the first and second cam shafts 110 and 120 in FIG. 16. 230 is a sun gear fixedly attached to the first cam shaft 110, and 231 is a ring gear attached to the foremost end of the first cam shaft 110 by the medium of a bearing 232 so as to be free to rotate. The ring gear 231 is provided with an internal gear 233 and an external gear 234. 235 is a planet gear which is meshed with the sun gear 230 and the internal gear 233, 236 is a support shaft of the planet gear 235, and 237 is a carrier to which the support shaft 236 is fixedly attached. The carrier 237 is attached to the cylinder head 101 by a shaft so as to freely rotate, and a worm wheel 238 of a sector form is provided at the outer perimeter. The worm wheel 238 is meshed with a worm 241, which is driven by an electric motor 240.

At the second cam shaft 120 supported by a shaft at the cylinder head 101, a gear 242, which is meshed with the external gear 234, and a timing gear 243 are fixedly attached. The timing gear 243 is meshed with a crank gear 246 fixedly attached to a crankshaft 245 by the medium of an idle gear 244.

Here, when the number of teeth of the sun gear 230 is Z1, the number of teeth of the internal gear 233 of the ring gear 231 is Z2, the number of teeth of the gear 242 is Z3, and the number of teeth of the external gear 234 of the ring gear 231 is Z4, wherein Z1 / Z2=Z3 / Z4. The ratio of the numbers of teeth of the crank gear 246 and the timing gear 243 is ½. Accordingly, the rotational speed of the second cam shaft 120 is ½ of the rotational speed of the crankshaft 245, and the second cam shaft 120 and the first cam shaft 110 have the same rotational speed.

The operation by the aforementioned structure will now be described. When the phase of the first cam shaft 110 and the second cam shaft 120 is changed, the worm 241 is rotated by the electric motor 240, and the worm wheel 238 is rotated to a specified angle. The carrier 237 rotates at the same time, since the carrier 237 is integrated with the worm wheel 238, and the planet gear 235 rotates the ring gear 231 by revolving around the sun gear 230 as the planet gear 235 is rotating. Accordingly, the gear 242 rotates, and the phase of the second cam shaft 120 to the first cam shaft 110 is changed. The rotational angle ratio γ of the gear 242 and the worm wheel 238 at this time can be obtained from the following formula.

$$\gamma = [(Z1+Z2)/Z2] \cdot Z4/Z3$$

Accordingly, the variable valve timing device, in which the gear 242 rotates at a large angle only by rotating the worm wheel 238 at a small angle, can easily give a phase difference in the range of 70° to 90° between the first cam shaft 110 and the second cam shaft 120.

Summing up the aforementioned present embodiments, two cam shafts are connected by the medium of a planetary gear unit consisting of the sun gear, ring gear and the planet gear, and one cam shaft is fixedly attached to the sun gear while the other cam shaft is fixedly attached to a gear which is meshed with the ring gear. The carrier supporting the planet gear is rotatably attached to a case supporting the sun gear shaft, and is connected to a rotational driving device. Accordingly, the rotational speed of the gear meshed with the ring gear is increased, relative to the rotation of the carrier. In other words, when the carrier is rotated over a small angle by the rotational driving device, the gear is rotated over a large angle.

INDUSTRIAL AVAILABILITY

The present invention is useful as a variable compression ratio engine, which can convert between an early closing or a late closing Miller cycle operation and a normal cycle operation, and which can reduce the generation of NOx, etc., and can prevent the occurrence of knocking.

I claim:

1. A variable compression ratio engine for operating in a first condition under a heavy load and in a second condition under a light load, said engine comprising:

at least one cylinder chamber;

at least one piston, each piston being positioned in a respective cylinder chamber;

first and second intake valves per cylinder chamber;

at least one exhaust valve per cylinder chamber;

a first cam shaft provided with cams for opening and closing said first intake valve and said at least one exhaust valve;

a second cam shaft provided with cams for opening and closing said second intake valve and at least one of said at least one exhaust valve; and a device for changing a phase, between cams on said second cam shaft and cams on said first cam shaft, between a first phase for operating in said first condition under a heavy load and a second phase for operating in said second condition under a light load;

whereby a compression ratio of said engine can be changed by changing a timing of the opening and closing of said intake valves and/or said at least one exhaust valve;

whereby, in an intake stroke during said first condition under a heavy load, said device sets said intake valves to close at a time before the respective piston is at a bottom dead center of its cycle, and said device sets at least one of said at least one exhaust valve to open and close at times when the respective piston is in the vicinity of a top dead center of its cycle; and whereby, in an intake stroke during said second condition under a light load, said device sets at least one of said intake valves to close at a time when the respective piston is in the vicinity of the bottom dead center of its cycle, and said device sets at least one of said at least one exhaust valve to open and close at times before the respective piston is at the bottom dead center of its cycle so as to recirculate part of the exhaust gas from said cylinder chamber into intake gas for said cylinder chamber.

2. A variable compression ratio engine in accordance with claim 1, wherein said at least one exhaust valve comprises first and second exhaust valves;

wherein said first cam shaft is provided with cams for opening and closing said first intake valve and said first and second exhaust valves; and wherein said second cam shaft is provided with cams for opening and closing said second intake valve and said second exhaust valve.

3. A variable compression ratio engine in accordance with claim 1, wherein said device comprises:

a planetary gear unit provided with a sun gear, a ring gear, and a planet gear, said sun gear being fixedly attached to said first cam shaft;

a gear which is meshed with said ring gear and fixedly attached to said second cam shaft;

a support shaft for said planet gear; and a driving device for changing a relative positional relationship between said support shaft for said planet gear and said first cam shaft.

4. A variable compression ratio engine in accordance with claim 1, wherein said time before the respective piston is at a bottom dead center of its cycle is a time when a crank rotational angle is in the range of 20° to 90° before the respective piston is at the bottom dead center of its cycle.

5. A variable compression ratio engine for operating in a first condition under a heavy load and in a second condition under a light load, said engine comprising:

at least one cylinder chamber;

at least one piston, each piston being positioned in a respective cylinder chamber;

first and second intake valves per cylinder chamber;

at least one exhaust valve per cylinder chamber;

a first cam shaft provided with cams for opening and closing said first intake valve and said at least one exhaust valve;

a second cam shaft provided with cams for opening and closing said second intake valve and at least one of said at least one exhaust valve; and a device for changing a phase, between cams on said second cam shaft and cams on said first cam shaft, between a first phase for operating in said first condition under a heavy load and a second phase for operating in said second condition under a light load;

whereby a compression ratio of said engine can be changed by changing a timing of the opening and closing of said intake valves and/or said at least one exhaust valve;

whereby, in an intake stroke during said second condition under a light load, said intake valves are set to close at a time when the respective piston is in the vicinity of a bottom dead center of its cycle, and at least one of said at least one exhaust valve is set to open and close at times before the respective piston is at the bottom dead center of its cycle so as to recirculate part of the exhaust gas from said cylinder chamber into intake gas for said cylinder chamber; and whereby, in an intake stroke during said first condition under a heavy load, at least one of said intake valves is set to close at a time after the respective piston is at the bottom dead center of its cycle, and at least one of said at least one exhaust valve is set to open and close at times when the respective piston is in the vicinity of the bottom dead center of its cycle.

6. A variable compression ratio engine in accordance with claim 5, wherein said at least one exhaust valve comprises first and second exhaust valves;

wherein said first cam shaft is provided with cams for opening and closing said first intake valve and said first and second exhaust valves; and wherein said second cam shaft is provided with cams for opening and closing said second intake valve and said second exhaust valve.

7. A variable compression ratio engine in accordance with claim 5, wherein said device comprises:

a planetary gear unit provided with a sun gear, a ring gear, and a planet gear, said sun gear being fixedly attached to said first cam shaft;

a gear which is meshed with said ring gear and fixedly attached to said second cam shaft;

a support shaft for said planet gear; and a driving device for changing a relative positional relationship between said support shaft for said planet gear and said first cam shaft.

8. A variable compression ratio engine in accordance with claim 5, wherein said time before the respective piston is at a bottom dead center of its cycle is a time when a crank rotational angle is in the range of 20° to 90° before the respective piston is at the bottom dead center of its cycle.

9. A variable compression ratio engine for operating under a first condition or under a second condition, said engine comprising:

at least one cylinder chamber;

at least one piston, each piston being positioned in a respective cylinder chamber;

first and second intake valves per cylinder chamber;

at least one exhaust valve per cylinder chamber;

a first cam shaft provided with cams for opening and closing said first intake valve and said at least one exhaust valve;

a second cam shaft provided with a cam for opening and closing said second intake valve; and an intake device for changing a phase, between said cam on said second cam shaft and cams on said first cam shaft, between a first phase for operating in said first condition and a second phase for operating in said second condition;

whereby a compression ratio of said engine can be changed by changing a timing of the opening and closing of said intake valves and/or said at least one exhaust valve;

whereby, in an intake stroke during said first condition, said intake valves are set to close at a time before the respective piston is at a bottom dead center of its cycle; and whereby, in an intake stroke during said second condition, at least one of said intake valves is set to close at a time when the respective piston is in the vicinity of the bottom dead center of its cycle.

10. A variable compression ratio engine in accordance with claim 9, wherein said time before the respective piston is at a bottom dead center of its cycle is a time when a crank rotational angle is in the range of 20° to 90° before the respective piston is at the bottom dead center of its cycle.

11. A variable compression ratio engine in accordance with claim 9, wherein said at least one exhaust valve comprises first and second exhaust valves;
   wherein said first cam shaft is provided with cams for opening and closing said first intake valve and said first and second exhaust valves; and
   wherein said second cam shaft is provided with said cam for opening and closing said second intake valve.

12. A variable compression ratio engine in accordance with claim 9, wherein said device comprises:
   a planetary gear unit provided with a sun gear, a ring gear, and a planet gear, said sun gear being fixedly attached to said first cam shaft;
   a gear which is meshed with said ring gear and fixedly attached to said second cam shaft;
   a support shaft for said planet gear; and
   a driving device for changing a relative positional relationship between said support shaft for said planet gear and said first cam shaft.

13. A variable compression ratio engine for operating in a first condition or in a second condition, said engine comprising:
   at least one cylinder chamber;
   at least one piston, each piston being positioned in a respective cylinder chamber;
   first and second intake valves per cylinder chamber;
   at least one exhaust valve per cylinder chamber;
   a first cam shaft provided with cams for opening and closing said first intake valve and said at least one exhaust valve;
   a second cam shaft provided with cams for opening and closing said second intake valve and at least one of said at least one exhaust valve;
   a planetary gear unit provided with a sun gear, a ring gear, and a planet gear, said sun gear being fixedly attached to said first cam shaft;
   a gear which is meshed with said ring gear and fixedly attached to said second cam shaft;
   a support shaft for said planet gear; and
   a variable valve timing device which changes valve timing by adjusting a phase, between said first and second cam shafts, between a first phase for operating in said first condition and a second phase for operating in said second condition, by freely changing a relative positional relationship between said support shaft for said planet gear and said first cam shaft, whereby a compression ratio of said engine can be changed by changing said valve timing and a part of exhaust gas from said cylinder chamber is recirculated into intake gas for said cylinder chamber during said second condition.

* * * * *